United States Patent [19]
Heyer et al.

[11] Patent Number: 5,804,146
[45] Date of Patent: Sep. 8, 1998

[54] CHEMICAL OXYGEN GENERATOR

[75] Inventors: Harald Heyer, Wesenberg; Udo Burchardt, Gross Grönau; Rainer Ernst, Stockelsdorf-Curau, all of Germany

[73] Assignee: Drägerwerk AG, Lübeck, Germany

[21] Appl. No.: 810,400

[22] Filed: Mar. 4, 1997

[30] Foreign Application Priority Data

Apr. 19, 1996 [DE] Germany .................. 196 15 501.0

[51] Int. Cl.⁶ .................. A62B 7/08; B01J 7/00
[52] U.S. Cl. .................. 422/126; 422/120; 422/122; 422/165; 95/132; 128/202.26
[58] Field of Search .................. 422/128, 122, 422/120, 126, 164–165; 95/132, 131; 96/135; 128/202.26

[56] References Cited

U.S. PATENT DOCUMENTS

| | | | |
|---|---|---|---|
| 3,868,225 | 2/1975 | Tidd | 422/126 |
| 4,200,615 | 4/1980 | Hamilton et al. | 422/126 |
| 4,342,725 | 8/1982 | Collins | 422/126 |
| 4,687,640 | 8/1987 | Schillaci | 422/120 |
| 4,822,572 | 4/1989 | van der Smissen et al. | 422/126 |

FOREIGN PATENT DOCUMENTS

| | | |
|---|---|---|
| 678 587 | 6/1939 | Germany . |
| OS 20 26 663 | 12/1970 | Germany . |
| 34 22 021 A1 | 12/1985 | Germany . |
| 1288459 | 9/1972 | United Kingdom . |
| 1 313 766 | 4/1973 | United Kingdom . |

*Primary Examiner*—Hien Tran
*Attorney, Agent, or Firm*—McGlew and Tuttle

[57] ABSTRACT

A chemical oxygen generator with a chemical mass, which is accommodated inside a container, generates oxygen by a chemical reaction, and is held in the container by a gas-permeable fibrous material. The fibrous material is arranged around the chemical mass. The fibrous material is designed as a chemical sorption filter.

8 Claims, 2 Drawing Sheets

CHEMICAL OXYGEN GENERATOR

FIELD OF THE INVENTION

The present invention pertains to a chemical oxygen generator with a chemical mass, which is accommodated inside a container, generates oxygen by a chemical reaction and is held in the container by a, gas-permeable fibrous material arranged around it.

BACKGROUND OF THE INVENTION

Oxygen generators based on chlorate are, in general, pressed objects containing a chemical releasing oxygen, e.g., potassium chlorate, wherein certain additives are added to the fuel to maintain the chemical reaction or to remove harmful components. For example, iron and manganese are added to maintain the oxygen production, whereas, e.g., barium peroxide is used to remove chlorine. Such an oxygen generator has become known from DE-OS 20 26 663. In the prior-art oxygen generator, the heat generated during the reaction is kept away from the sheet-metal housing of the generator by an insulating jacket, which consists of a fibrous material. The dusts generated during the reaction of the chemical mass, e.g., salt dusts, are also retained by the fibrous material.

Harmful components, which must be captured, can still be formed during the conversion of the chemicals into oxygen despite the additives. An additional chemical filter, through which the oxygen generated flows along with its impurities, is used for this purpose. The impurities are bound in this filter by chemisorption (catalytic decomposition) or by physical adsorption. The dusts (particles) are retained by chemical separation in a physical filter (particle filter) located at a short distance before the outlet. The installation of an additional filter for removing the impurities appreciably increases the weight of the oxygen generator. Oxygen generators with minimal weight are needed especially in aviation because of economic requirements. An additional chemical filter in these oxygen generators also increases the cost in connection with a subsequent disposal, because the substances contained in the filter usually must be treated as special waste.

SUMMARY AND OBJECTS OF THE PRESENT INVENTION

The primary object of the present invention is to improve an oxygen generator such that the harmful gases generated during the chemical reaction can be removed in a simple manner.

According to the invention, a chemical oxygen generator is provided with a chemical mass. The chemical mass is accommodated inside a container and generates oxygen by a chemical reaction. The chemical mass is held in the container by a, gas-permeable fibrous material arranged around it. The fibrous material comprises a sorption filter.

The advantage of the present invention is essentially that the impurities formed during the chemical reaction are removed by the fibrous material designed as a sorption filter and are thus removed directly at the site at which they are generated.

The sorption filter advantageously consists of the fibrous material impregnated with a sorbent. The suitable substances for the impregnation are chemicals of a basic character, e.g., hydroxides and carbonates. Sodium hydroxide and calcium hydroxide have proved to be particularly effective for removing chlorine.

These substances may be applied in the form of an aqueous solution or suspension containing a few weight percent by briefly immersing the fibrous material into the solution or the suspension or by spraying the fibrous material with the solution or the suspension and subsequently freeing the parts of water in a desiccator.

The weight of substance applied to the fibrous material is about 1 g to 3 g, depending on the type of the generator. This is in the range of variation of the overall weight of the generator during its manufacture. In contrast, a prior-art chemical filter has a weight between 20 g and 50 g, depending on the design of the generator.

One exemplary embodiment of the present invention is shown in the drawing and will be explained in greater detail below.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
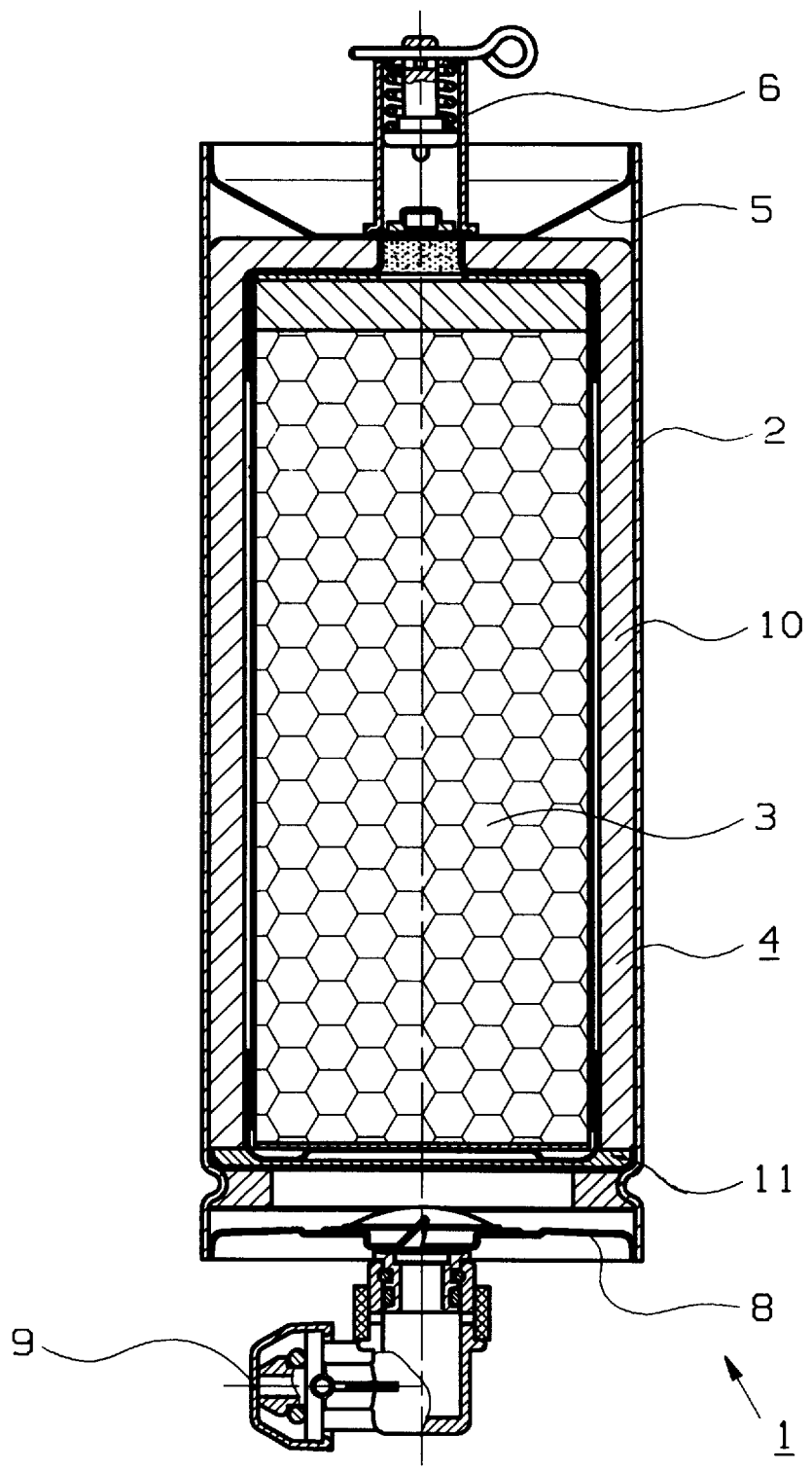
FIG. 1 is a longitudinal sectional view of an oxygen generator.

Referring to the drawings in particular, the oxygen generator 1 shown in FIG. 1 contains in a container 2 a reactive chemical 3, which is surrounded by a fibrous layer 4 that is permeable to gas. An igniting device 6 is arranged on the top front side 5 of the container 2 in the known manner in order to start the chemical reaction. The oxygen generated escapes via an outlet opening 9 located on the lower top side 8 of the container 2. The igniting device 6 is designed as a percussion fuse in the known manner. The fibrous layer 4 consists of a pot-shaped ceramic fiber molding 10 and a ceramic fiber disk 11 lying on the open front side of the ceramic fiber molding 10. The molding 10 and the disk 11 are impregnated with sodium hydroxide by briefly immersing the molding 10 and the disk 11 into an aqueous solution of sodium hydroxide and subsequently drying them.

The oxygen generated by the chemical 3 first enters the molding 10 and from there it flows to the outlet opening 9 via the disk 11. The dusts and particles generated during the chemical reaction of the chemical 3 are first filtered out in the molding 10. The chlorine formed during the decomposition of the chemical 3 is bound by the sodium hydroxide impregnation during the flow through the molding 10 as well as through the disk 11.

Figure 2A:
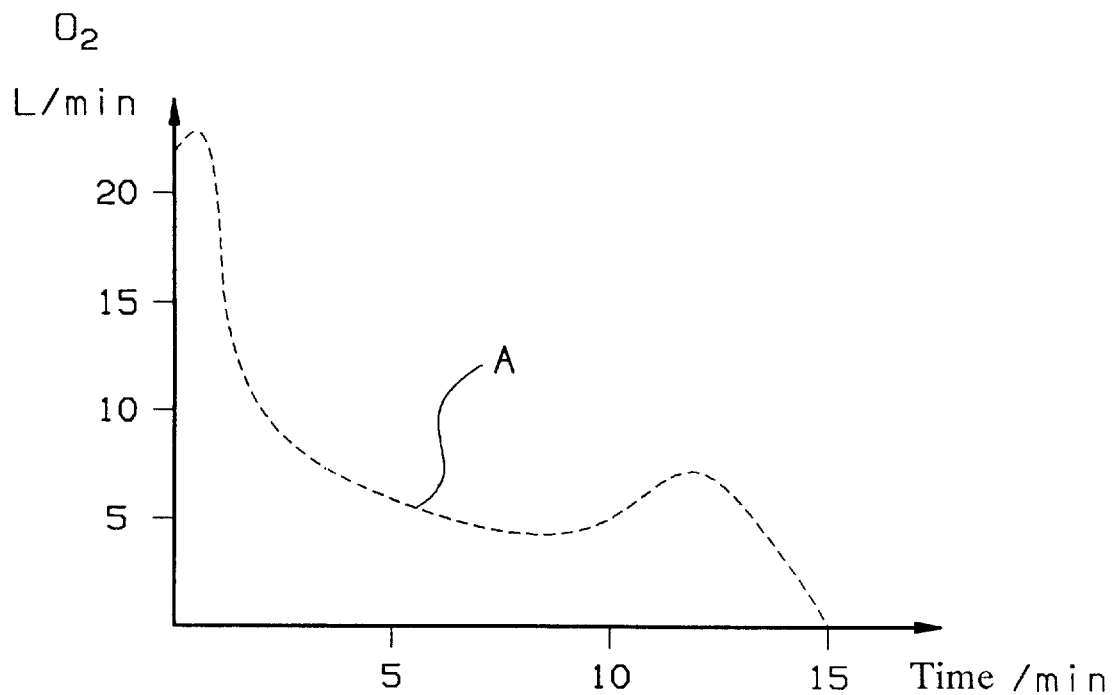
FIG. 2a is a diagram showing the oxygen production as a function of time.
Figure 2B:
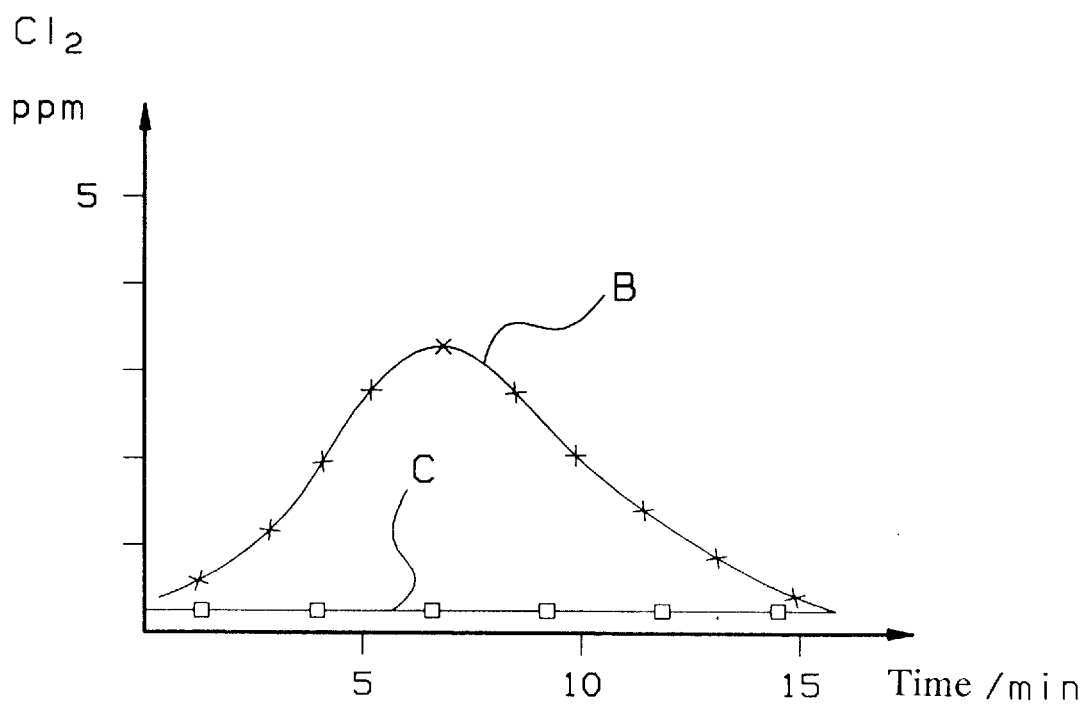
FIG. 2b is a diagram showing chlorine production as a function of time.

The effectiveness of the impregnation according to the present invention will be illustrated by the following FIGS. 2a, 2b.

Curve A in FIG. 2a shows the oxygen production as a function of the reaction time of the oxygen generator 1. FIG. 2b shows the chlorine production belonging to curve A, specifically as a curve B for a device according to the state of the art without impregnated fibrous layer and as a curve C with the impregnation of the fibrous material according to the present invention. The chlorine concentration is under a value of 0.2 ppm of chlorine in the case of curve C.

While a specific embodiment of the invention has been shown and described in detail to illustrate the application of the principles of the invention, it will be understood that the invention may be embodied otherwise without departing from such principles.

What is claimed is:

1. A chemical oxygen generator, comprising:

a container;

a chemical mass, which is accommodated inside said container, for generating oxygen by a chemical reaction;

a gas-permeable fibrous material arranged around said chemical mass for holding said chemical mass; and a sorption material impregnated in said gas-permeable fibrous material; said gas-permeable fibrous material and said sorption material form a sorption filter and a sorbent for chlorine is provided in said sorbent material and is sodium hydroxide or calcium hydroxide.

2. A chemical oxygen generator in accordance with claim 1, wherein said fibrous material is a ceramic fiber.

3. A generator in accordance with claim 1, wherein:

said chemical mass also generates a plurality of impurities;

said sorption material chemically reacts with one of said plurality of impurities.

4. A generator in accordance with claim 3, wherein:

said fibrous material physically blocks another one of said impurities.

5. A generator in accordance with claim 3, wherein:

said one of said impurities is a gas.

6. A generator in accordance with claim 1, wherein;

said sorption material is intermixed with said fibrous material.

7. A chemical oxygen generator comprising:

a container;

a chemical mass, which is accommodated inside said container, for generating oxygen by a chemical reaction; and a gas-permeable fibrous material arranged around said chemical mass for holding said chemical mass, said fibrous material being impregnated with one of sodium hydroxide and calcium hydroxide as a sorbent for chlorine.

8. A chemical oxygen generator in accordance with claim 7, wherein said fibrous material is a ceramic fiber.

* * * * *